United States Patent [19]

Sugiyama

[11] Patent Number: 5,045,938
[45] Date of Patent: Sep. 3, 1991

[54] METHOD AND APPARATUS FOR ENCODING USING VARIABLE LENGTH CODES

[75] Inventor: Kenji Sugiyama, Noda, Japan
[73] Assignee: Victor Company of Japan, Ltd., Japan
[21] Appl. No.: 556,494
[22] Filed: Jul. 24, 1990
[30] Foreign Application Priority Data Aug. 19, 1989 [JP] Japan .................... 1-213939

[51] Int. Cl.⁵ ............................................ H04N 7/12
[52] U.S. Cl. .................................. 358/133; 358/433
[58] Field of Search .............. 358/133, 136, 135, 433, 358/432; 382/56

[56] References Cited

U.S. PATENT DOCUMENTS

| | | | |
|---|---|---|---|
| 4,805,030 | 2/1989 | Tanaka | 358/433 |
| 4,821,119 | 4/1989 | Gharavi | 358/133 X |
| 4,920,426 | 4/1990 | Hatori et al. | 358/433 |
| 4,951,157 | 8/1990 | Koh et al. | 358/433 |

OTHER PUBLICATIONS

"Efficiency Comparison for Entropy Coding Methods of Coefficients in MC/DCT Hybrid Coding" by M. Ohta et al.; Picture Coding Symposium, Japan, 1986 (PCSJ86).
"Comparison for Some Entropy Coding Methods in Color Still Picture Coding" by Y. Tsuboi et al.; Picture Coding Symposium, Japan, 1987 (PCSJ87).

*Primary Examiner*—Victor R. Kostak
*Attorney, Agent, or Firm*—Lowe, Price, LeBlanc, Becker & Shur

[57] ABSTRACT

A video signal is transformed into first blocks each containing transform coefficients. A plurality of adjacent first blocks are combined into a single second block. Transform coefficients of the second block are rearranged, and transform coefficients of equal-components of the first blocks are made successive to form sucessions of the transform coefficients of the equal-components of the first blocks. The successions are arranged in a predetermined order to compose a one-dimensional sequence of the transform coefficients. Non-zero transform coefficients of the sequence are encoded into corresponding variable-length codes. Successively-appearing zero transform coefficients of the sequence are encoded into a corresponding variable-length code.

4 Claims, 3 Drawing Sheets

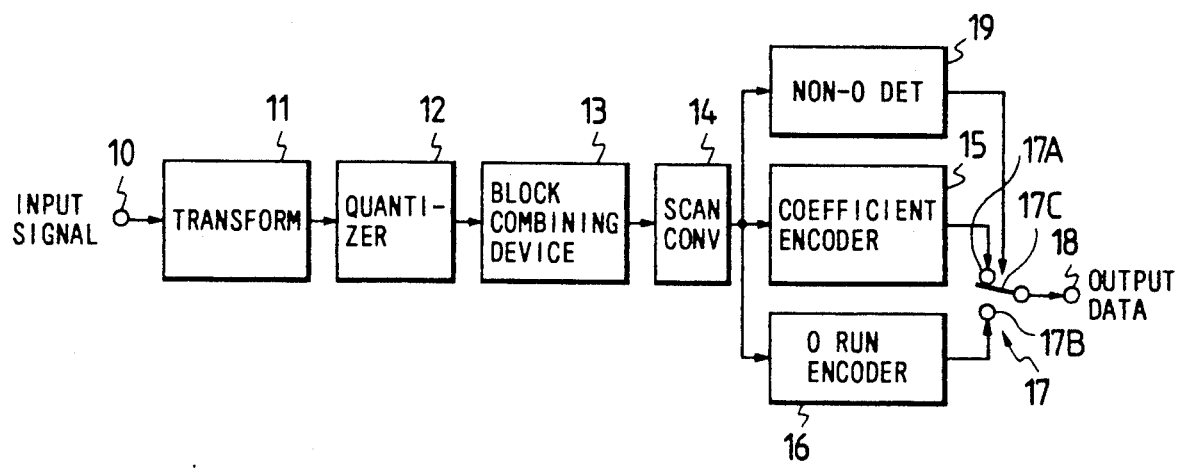

METHOD AND APPARATUS FOR ENCODING USING VARIABLE LENGTH CODES

BACKGROUND OF THE INVENTION

1. Field of the Invention

This invention relates to a method and an apparatus for encoding which uses variable-length codes.

2. Description of the Prior Art

Some video signal transmission systems include a combination of a quantizer and an encoder for converting a video signal into variable-length codes. Such encoding enables a reduction of an amount of transmitted information data and thus an efficient transmission of the data.

In typical encoding which uses variable-length codes, Huffman codes are generated in accordance with the frequencies of occurrence of respective data values which are previously determined statistically. In this case, the amount of the coded data is close to the amount of original information.

In some encoding, pixel data values are subjected to an orthogonal transform such as a discrete cosine transform, and generated transform coefficients are quantized. Generally, most of the quantized transform coefficients are "0". The average information amount per pixel is sometimes smaller than a level corresponding to one bit. In cases where codes are allotted to the respective transform coefficient values, since a code having at least one bit is necessary for "0", the average code length tends to be large with respect to the amount of the original information so that the transmission efficiency tends to be low.

Accordingly, in improved encoding, a variable-length code is not allotted to each of the zero transform coefficients but a group of the zero transform coefficients is encoded together. To discriminate the code for a group of the zero transform coefficients from codes for non-zero transform coefficients, the absence of "0" is encoded in the case where non-zero transform coefficients appear in succession.

Specifically, run length codes (zero run codes) are used to represent the number of successively-appearing zero transform coefficients. In cases where a frame of a video signal is divided into two-dimensional blocks and an orthogonal transform is applied to each of these signal blocks, the two-dimensional signal sequence is rearranged into a one-dimensional signal sequence by a suitable way such as a zigzag scanning process.

In view of the fact that the zero run codes and the codes for the non-zero transform coefficients appear alternately, some encoding systems pair these codes and thereby generate two-dimensional variable-length codes. Generally, a last zero run set, which is not followed by a code for a non-zero transform coefficient, is not encoded in length but is expressed in common by the code representing the absence of a non-zero transform coefficient. This code is referred to as an EOB (end of block) code.

In encoding which uses an orthogonal transform, as the size of signal blocks increases, the encoding efficiency rises but quantization errors spread over a wider region. On the other hand, as the size of blocks decreases, the encoding efficiency drops and also the following problems arise. For example, in cases where successive blocks have differential-type transform coefficients which are all "0", an EOB code is necessary for each of the blocks and a larger number of EOB codes are necessary for one frame. Furthermore, the run lengths are short and the number of different types of the codes is small, so that the average code length tends to be large in the case of Huffman codes.

SUMMARY OF THE INVENTION

It is an object of this invention to provide an improved method and an improved apparatus for variable-length codes.

According to a first aspect of this invention, a method for variable-length codes comprises the steps of transforming a video signal into first blocks each containing transform coefficients; combining a plurality of adjacent first blocks into a single second block; rearranging transform coefficients of the second block and making transform coefficients of equal-components of the first blocks successive to form successions of the transform coefficients of the equal-components of the first blocks; arranging the successions in a predetermined order to compose a one-dimensional sequence of the transform coefficients; encoding non-zero transform coefficients of the sequence into corresponding variable-length codes; and encoding successively-appearing zero transform coefficients of the sequence into a corresponding variable-length code.

According to a second aspect of this invention, an apparatus for variable-length codes comprises means for transforming a video signal into first blocks each containing transform coefficients; means for combining a plurality of adjacent first blocks into a single second block; means for rearranging transform coefficients of the equal-components of the first blocks successive to form successions of the transform coefficients of the equal-components of the first blocks; means for arranging the successions in a predetermined order to compose a one-dimensional sequence of the transform coefficients; means for encoding non-zero transform coefficients of the sequence into corresponding variable-length codes; and means for encoding successively-appearing zero transform coefficients of the sequence into a corresponding variable-length code.

According to a third aspect of this invention, a method of converting orthogonal transform coefficients into variable-length codes comprises the steps of dividing a video signal of a picture into first blocks each containing predetermined number of pixels which are adjacent to each other on the picture; orthogonally transforming the video signal for each of the first blocks to generate second blocks of transform coefficients; combining a plurality of the second blocks, corresponding to a plurality of the first blocks which are adjacent to each other on the picture, into a third block; sequentially outputting transform coefficients corresponding to equal picture characteristics from transform coefficients composing the third block; and converting a sequence of the outputted transform coefficients into variable-length codes.

According to a fourth aspect of this invention, an apparatus for variable-length codes comprises means for transforming a video signal into first blocks of transform coefficients; means for combining a plurality of adjacent first blocks into a single second block; means for rearranging transform coefficients of the second block and for making equal-position transform coefficients of the first blocks successive to form successions of the equal-position transform coefficients of the first blocks; means for arranging the successions in a predetermined order to compose a one-dimensional sequence of the transform coefficients; a first encoder encoding non-zero transform coefficients of the sequence into corresponding first variable-length codes; a second encoder encoding successively-appearing zero transform coefficients of the sequence into a corresponding second variable-length code; means for detecting whether or not a transform coefficient of the sequence is zero and for generating a signal representative thereof; and means responsive to the signal generated by the detecting means for selecting the first codes as apparatus output codes when the transform coefficient of the sequence is not zero, and for selecting the second code as apparatus output code when the transform coefficient of the sequence is zero.

BRIEF DESCRIPTION OF THE DRAWINGS

FIG. 1 is a block diagram of an apparatus according to an embodiment of this invention.

FIGS. 2a and 2b are diagrams showing a block writing sequence and a block reading sequence in the block combining device of FIG. 1.

DESCRIPTION OF THE PREFERRED EMBODIMENT

Figure 3:
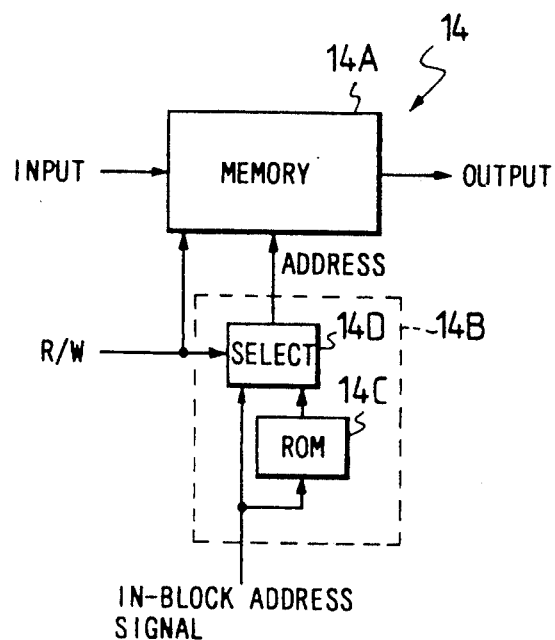
FIG. 3 is a block diagram of the scan converter of FIG. 1.

With reference to FIG. 1, a digitized video signal is fed to an orthogonal transform device 11 via an input terminal 10. Since the orthogonal transform device 11 executes a block transform, a frame of the input video signal is divided into a predetermined number of pixel blocks each having 4×4 pixels. In each of the pixel blocks of the input video signal, pixel data values are subjected by the orthogonal transform device 11 to an orthogonal transform such as a discrete cosine transform and are thus converted into orthogonal transform coefficients. In this way, the orthogonal transform device 11 converts a 4×4 size pixel block of the input video signal into a corresponding-size block of orthogonal transform coefficients.

The transform coefficients are sequentially outputted from the orthogonal transform device 11 to a quantizer 12. The quantizer 12 quantizes the transform coefficients with predetermined quantization steps. As a result, a 4×4 size block of quantized transform coefficients is generated.

The quantized transform coefficients are sequentially fed from the quantizer 12 to a block combining device 13. The block combining device 13 changes the arrangement of 4×4 size transform coefficient blocks into an arrangement of 8×8 transform coefficient blocks by combining four 4×4 size blocks, which are adjacent to each other horizontally and vertically, into a single 8×8 size block.

Specifially, the block combining device 13 includes a combination of a read/write memories and an address generator. If 400 pixels per horizontal line are assumed, then the number of blocks of 4×4 elements in horizontal direction becomes 100. The block combining device 13 has two memories designated as memory-1 and memory-1, having a capacity corresponding to 200 blocks of 4×4 elements respectively and one of them stores a group of 200 blocks while the other outputs another group of 200 blocks previously stored. The quantized transform coefficients outputted from the quantizer 12 are written into respective storage locations of one of the memories of the block combining device 13 which are designated by an address signal fed from the address generator of the block combining device 13. When the memory bomes full, successive transfrom coefficients are written to another memory in the same manner, while the transofrm coefficients so written are read out from the respective storage locations of the memory which are designated by the an address signal fed from the address generator. The address generator in the block combining device 13 is designed so that the writing of the transform coefficients into the memories and the reading of the transform coefficients from the memories will be performed in different sequences as shown in FIG. 2.

As shown in FIG. 2-A, successive blocks of 4×4 elements representing the output coefficient data from the quantizer 12 are sequentially written into the memories of the block combining device 13 in such an order that first and second 100 blocks are stored to upper and lower half of the memory-1 respectively. Third and fourth 100 blocks are stored to the memory-2 in the same manner as shown in FIG. 2-A. In this figure, square segments denote respective 4×4 size blocks, and numbers of these segments indicate the order for storing.

As shown in FIG. 2-B, a group of 200 blocks stored in one of the memories of the block combining device 13 are grouped into sets each having four blocks adjacent to each other horizontally and vertically, and these sets are sequentially read out from the memory while four blocks in each of the sets are read out from the memory in a predetermined sequence. Each matrix set forms an 8×8 size blocks. In the right-hand part of FIG. 2, the square segments denote respective 4×4 size blocks, and the numerals in the square segments denote the numbers in the reading order.

It should be noted that the block combining device 13 can be a scan converter.

Each 8×8 size block of the quantized transform coefficients is outputted from the block combining device 13 to a scan converter 14. The scan converter 14 changes the sequence of scanning of the transform coefficients. As shown in FIG. 3, the scan converter 14 includes a combination of a read/write memory 14A and an address generator 14B. The memory 14A has a capacity corresponding to two blocks of 8×8 elements. Each 8×8 size block of the transform coefficients outputted from the block combining device 13 is written into the memory 14A in response to a read/write signal R/W fed from a suitable device (not shown). In addition, the transform coefficients are read out from the memory 14A in response to the read/write signal R/W. The output transform coefficients from the block combining device 13 are written into respective storage locations of the memory 14A which are designated by an address signal fed from the address generator 14B. In addition, the transform coefficients are read out from the respective storage locations of the memory 14A which are designated by an address signal fed from the address generator 14B. The address generator 14B is designed so that the writing of the transform coefficients into memory 14A and the reading of the transform coefficients from the memory 14A will be performed in different sequences to realize a scan conversion process as described below.

The address generator 14B includes a ROM 14C and a selector 14D. An in-block address signal generated by a suitable device (not shown) is fed to the ROM 14C and a first input terminal of the selector 14D. The ROM 14C converts the in-block address signal into a read address signal. The read address signal is outputted from the ROM 14C to a second input terminal of the selector 14D. A control terminal of the selector 14D receives the read/write signal R/W. The output terminal of the selector 14D is connected to the memory 14A. During the writing of the transform coefficients into the memory 14A, the selector 14D selects the in-block address signal in response to the read/write signal R/W and feeds the in-block address signal to the memory 14A as a write address signal. During the reading of the transform coefficients from the memory 14A, the selector 14D selects the read address signal and feeds the read address signal to the memory 14A. Since the write address signal and the read address signal are different from each other, the coefficient data writing and the coefficient data reading are performed in different sequences and thus a scan conversion process is realized.

Figure 4:
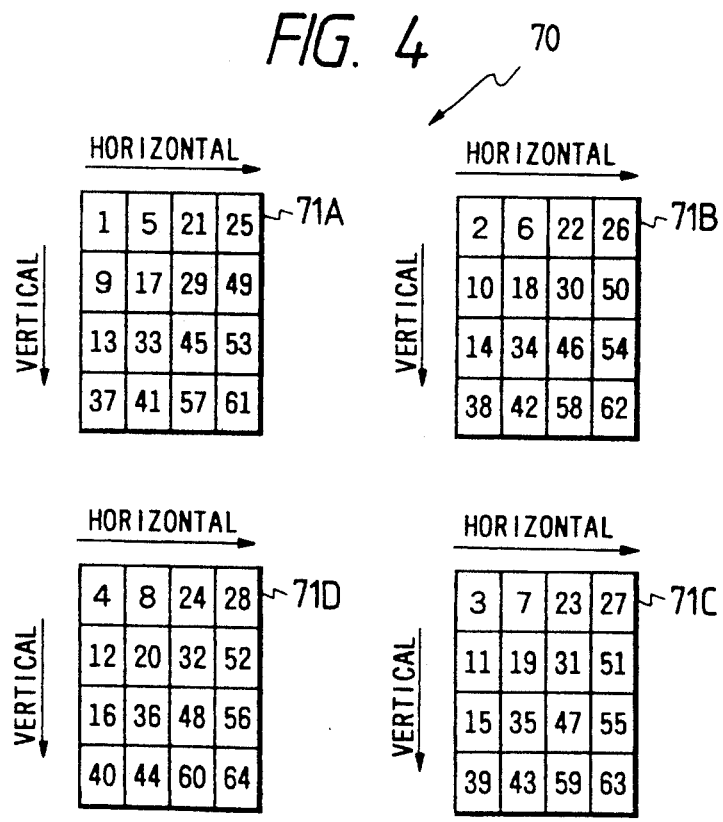
FIG. 4 is a diagram showing a block and its segments in the scan converter of FIGS. 1 and 3.

As shown in FIG. 4, each 8×8 size block 70 stored into the memory 14A of the scan converter 14 from the block combining device 13 has four 4×4 size blocks 71A, 71B, 71C, and 71D which are adjacent to each other horizontally and vertically. In FIG. 4, the square segments of each large square denoting a 4×4 size block represent respective transformed coefficients, and the numerals in the square segments denote the order for reading.

It should be noted that in the orthogonal coding, each transformed coefficient belonging among a block, represents respective properties of imagery included in a pixel block, for example one represents mean luminance (dc component) of the pixel block, one of the others represents a component of luminance variation (spatial frequency component) in the horizontal direction of the block and so on. When these coefficients are stored to memory blocks successively, the coefficients stored to the same position of the memory blocks have the same properties. In this embodiment, it is assumed that the coefficient representing the lowest patial frequency component in the pixel block, the coefficient representing the highest spatial frequency component in the horizontal direction in the pixel block, the coefficient representing the highest spatial frequency compoennt in the vertial direction in the pixel block and the coefficient representing the highest spatial frequency component in the both directions in the pixel block are placed to the upper-left corner, the upper-right corner, the lower-left corner and lower-right coner of the memory block respectively.

Figure 5:
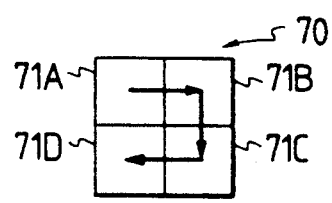
FIG. 5 is a diagram showing a block in the scan converter of FIGS. 1 and 3.
Figure 6:
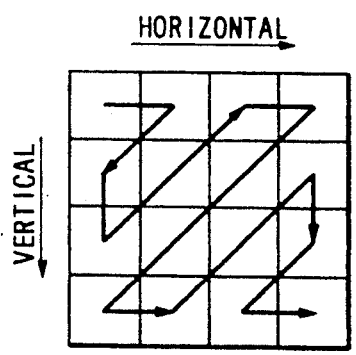
FIG. 6 is a diagram showing a zigzag scanning process in the scan converter of FIGS. 1 and 3.

As understood from FIG. 4, the reading of the transform coefficients from the memory 14A of the scan converter 14 is performed in the following order. First, the transform coefficients numbered 1 to 4 in the blocks 71A, 71B, 71C, and 71D are read out in a numerical order. In this way, the transform coefficients represented by the left upper corner elements of the blocks 71A-71D are successively read out in a predetermined order shown by the arrows of FIG. 5. Subsequently, the transform coefficients represented by the equal-position block elements horizontally adjacent to the left upper corner elements are read out in the predetermined order of FIG. 5. Next, the transform coefficients represented by the equal-position block elements vertically adjacent to the left upper corner elements are read out in the predetermined order of FIG. 5. During a subsequent period, the remaining transform coefficients represented by respective sets of the equal-position block elements are read out in the predetermined order of FIG. 5. Finally, the transform coefficients represented by the right lower corner elements of the blocks 71A-71D are read out in the predetermined order of FIG. 5. With respect to each of the blocks 71A-71D, as shown in FIG. 6, the transform coefficients are read out in a predetermined sequence realizing a zigzag scanning process. As a result of the zigzag scanning process, transform coefficients corresponding to lower-frequency components precede transform coefficients corresponding to higher-frequency components in the order of being outputted from the scan converter 14. In this way, the rearranged transform coefficients are sequentially outputted from the scan converter 14 as a one-dimensional signal.

The rearranged transform coefficients are sequentially fed from the scan converter 14 to the input terminals of a coefficient encoder 15, a zero run encoder 16, and a zero-coefficient detector 19. The output terminal of the coefficient encoder 15 is connected to a first fixed contact 17A of a switch 17. The output terminal of the zero run encoder 16 is connected to a second fixed contact 17B of the switch 17. A movable contact 17C of the switch 17, which is controlled by an output signal from the non zero-coefficient detector 19 and connected to an output terminal 18, selects the fixed contacts 17A and 17B and a neutral (non-contact) position.

The coefficient encoder 15 converts non-zero transform coefficients into corresponding Huffman codes. The zero run encoder 16 converts successions of zero transform coefficients into corresponding Huffman codes (zero run codes). The non zero-coefficient detector 19 detects whether a transfrom coefficient outputted from the scan converter 14 is zero or not. As far as the scan converter 14 outputs zero coefficient successively, the movable contact 17C stayes in neutral and there is no output code. When the output transform coefficient from the scan converter 14 differs from zero, the non zero-coefficient detector 19 controls the switch 17 so that the movable contact 17C selects the fixed contact 17B at first, and the fixed contact 17A in the next place, and returns to the neutral position. A consequence of this travelling of the movable contact 17C is that when a non zero coefficient is outputted from the scan converter 14, then a zero run code and a code corresponding to the coefficient are outputted successively from the terminal 18.

The distribution of quantized transform coefficients has a close relation with the characteristic of quantization. Accordingly, characteristics of the quantizer 12 are set and then a histogram of output data from the quantizer 12 is actually measured, and the Huffman codes are determined in view of the histogram.

As explained previously, adjacent small transform coefficient blocks are combined into a single large transform coefficient block, and the elements of the large block are rearranged so that transform coefficients represented by equal-position elements of the small matrixes will be successive. The resulting successions are arranged in a predetermined order. These processes of this invention produces the following advantages. Since at most one EOB code is necessary for each large block, the number of necessary EOB codes can be reduced in comparison with the case where four EOB codes are necessary for four small blocks. The run length is large so that the number of different types of codes can be increased. Therefore, in the generation of Huffman codes, the average code length can be short. The probability of successively-appearing non-zero transform coefficients is increased due to the inter-block correlation of transform coefficients, so that the average length of zero run codes is reduced.

What is claimed is:

1. A method for variable-length codes, comprising the steps of:

transforming a video signal into first blocks each containing transform coefficients;

combining a plurality of adjacent first blocks into a single second block;

rearranging transform coefficients of the second block and making transform coefficients of equal-components of the first blocks successive to form successions of the transform coefficients of the equal-components of the first blocks;

arranging the successions in a predetermined order to compose a one-dimensional sequence of the transform coefficients;

encoding non-zero transform coefficients of the sequence into corresponding variable-length codes; and encoding successively-appearing zero transform coefficients of the sequence into a corresponding variable-length code.

2. An apparatus for variable-length codes, comprising:

means for transforming a video signal into first blocks each containing transform coefficients;

means for combining a plurality of adjacent first blocks into a single second block;

means for rearranging transform coefficients of the second block and for making transform coefficients of equal-components of the first blocks successive to form successions of the transform coefficients of the equal-components of the first blocks;

means for arranging the successions in a predetermined order to compose a one-dimensional sequence of the transform coefficients;

means for encoding non-zero transform coefficients of the sequence into corresponding variable-length codes; and means for encoding successively-appearing zero transform coefficients of the sequence into a corresponding variable-length code.

3. A method of converting orthogonal transform coefficients into variable-length codes, comprising the steps of:

dividing a video signal of a picture into first blocks each containing predetermined number of pixels which are adjacent to each other on the picture;

orthogonally transforming the video signal for each of the first blocks to generate second blocks of transform coefficients;

combining a plurality of the second blocks, corresponding to a plurality of the first blocks which are adjacent to each other on the picture, into a third block;

sequentially outputting transform coefficients corresponding to equal picture characteristics from transform coefficients composing the third block; and converting a sequence of the outputted transform coefficients into variable-length codes.

4. An apparatus for variable-length codes, comprising:

means for transforming a video signal into first blocks of transform coefficients;

means for combining a plurality of adjacent first blocks into a single second block;

means for rearranging transform coefficients of the second block and for making equal-position transform coefficients of the first blocks successive to form successions of the equal-position transform coefficients of the first blocks;

means for arranging the successions in a predetermined order to compose a one-dimensional sequence of the transform coefficients;

a first encoder encoding non-zero transform coefficients of the sequence into corresponding first variable-length codes;

a second encoder encoding successively-appearing zero transform coefficients of the sequence into a corresponding second variable-length code;

means for detecting whether or not a transform coefficient of the sequence is zero and for generating a signal representative thereof; and means responsive to the signal generated by the detecting means for selecting the first codes as apparatus output codes when the transform coefficient of the sequence is not zero, and for selecting the second code as apparatus output code when the transform coefficient of the sequence is zero.

* * * * *